Figure 1:
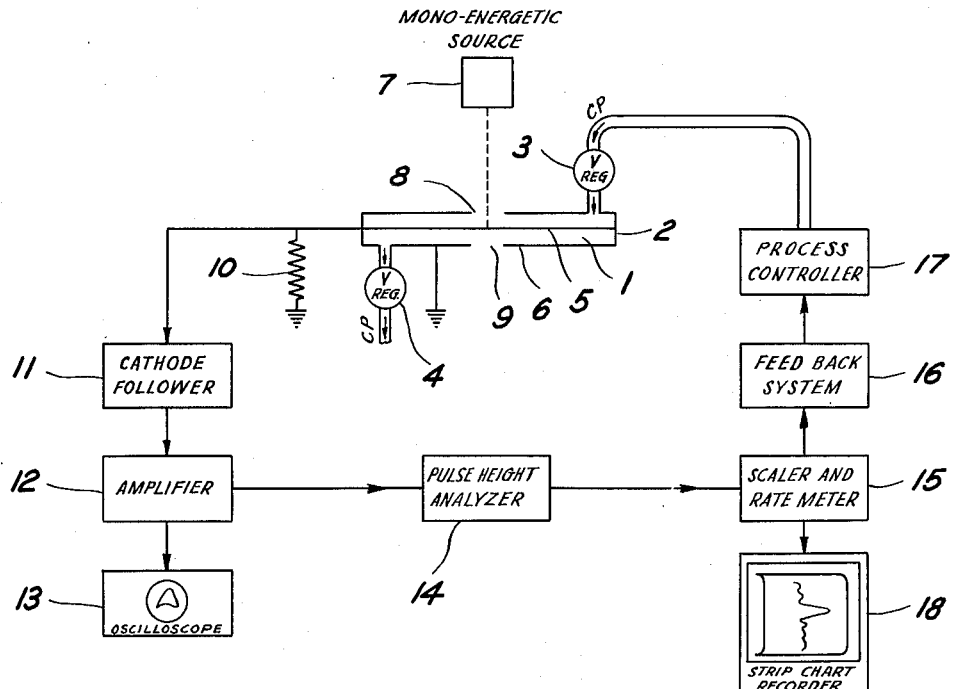

INVENTORS.
CHARLES F. HENDEE
SAMUEL FINE

2,977,473
APPARATUS FOR DETECTING AND MONITORING THE CONSTITUTION OF A GAS OR VAPOR

Charles Franklin Hendee, Irvington, and Samuel Fine, New York, N.Y., assignors to North American Philips Company, Inc., New York, N.Y., a corporation of Delaware Filed Oct. 28, 1954, Ser. No. 465,361

3 Claims. (Cl. 250—43.5)

Our invention relates to a non-destructive method and apparatus for analyzing the constitution of ionizable gases and vapors. More particularly, our invention relates to the detection and/or control of volatile elements and/or compounds which are ionizable in the gaseous or vapor state.

A principal object of our invention is the provision of a rapid non-destrucitve method for monitoring and controlling the constitution of a gas or vapor consisting of elements, volatile compounds or mixtures thereof.

A further object of our invention is to provide a suitable apparatus for controlling or monitoring the constitution of volatile compounds, elements and mixtures thereof.

These and further objects of our invention will appear as the specification progresses.

It is known that all elements whether in solid, liquid or gaseous form, when irradiated by photons of X-radiation having an energy content above their absorption edge will fluoresce and emit characteristic X-radiation or yield secondary electrons according to a naturally fixed ratio for each element. The dual effect of this principle is particularly apparent when elements or compounds in the gas or gaseous form used as the detecting vehicle in a proportional counter are subjected to radiation by X-rays of proper energy content in which the absorption of photons by the gas gives rise to a series of electrical signals, called pulses. If recorded, these pulses can be segregated into groups according to their amplitude and counted. Two groups will always be present. The pulses in one group called the "main" peak result when the mechanism of secondary electron emission takes place, whereby the incident energy is fully utilized in the production of electrons. The pulses in the other group called the "escape" peak occur when fluorescence takes place. The pulses in the escape peak are of lower amplitude than those in the main peak because part of the incident energy in the form of this fluorescence escapes from the sensitive volume of the counter and is not available for the production of electrons. When a plurality of gases absorbs X-radiation of sufficient energy content there will be one main peak and a plurality of escape peaks arising from the emission of characteristic fluorescent radiation of different energy from the various gases.

In accordance with our invention, we utilize these principles and introduce the gas or combination of gases to be analyzed or monitored into a proportional counter structure so that the gas being analyzed becomes a part of the device. A potential difference is then applied across the electrodes of the counter sufficient to produce proportional counting action when the gas is ionized. The gas is irradiated and ionized with a beam of mono-chromatic radiation resulting in pulses of electrical current flowing in an output circuit connected across the electrodes. When the pulses are recorded they exhibit a pulse height distribution characteristic of the components of the gas, which pulses are segregated into groups called main and escape peaks. The constitution of the gas can be determined by measuring the amplitude interval between the average of the amplitudes of the pulses in the main peak and the escape peak which in each instance is proportional to the energy of the characteristic X-radiation of the particular gas. In addition, the fluorescent yield, which is measured by taking the ratio between the number of counts in the escape peak to the number in the main and escape peaks, is a further means of identifying the constitution of the gas. The information thus obtained in the form of the number of counts, or the counting rate in the escape peaks can be employed to monitor or regulate the constitution of the gas. The gas being monitored flows through the proportional counter and is the counter filling gas.

Figure 2:
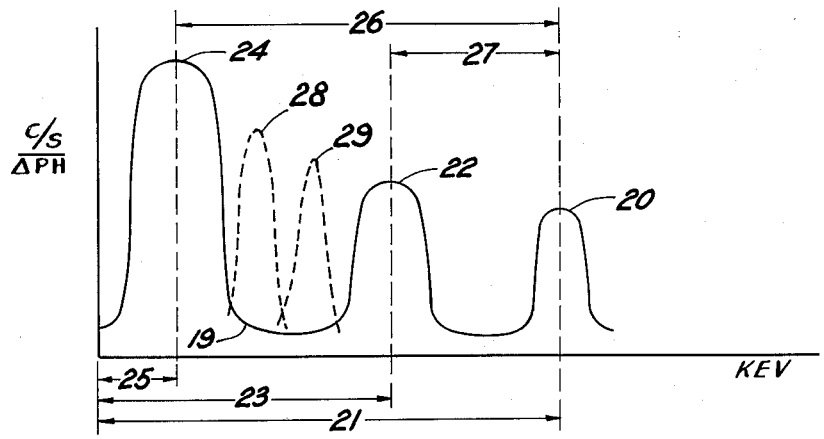

The invention will now be described in greater detail in connection with the accompanying drawing, in which:

Fig. 1 is a schematic diagram showing an apparatus according to the invention for detecting and monitoring a gas or vapor, and Fig. 2 is a graph showing a pulse height distribution of the output of a proportional counter with a typical gas or vapor filling excited by X-radiation of sufficient energy to produce fluorescence in the gas.

As shown in Fig. 1 a gas sample, for example, a mixture of xenon and krypton, is introduced into the chamber 1 of a proportional counter 2 at a constant pressure entering the chamber via valve 3 and leaving by valve 4. A potential difference sufficient to produce proportional counting action when the gas is ionized is impressed across anode 5 and cathode 6, the anode being at the higher potential. The gas in the counter is excited by a monoenergetic source 7 of ionizing radiation such as monochromatic X-radiation, radioactive isotope or particle source directed through a window 8 of the counter. Unabsorbed incident or primary radiation escapes through exit window 9. Current pulses produced in the output circuit by the absortpion of the mono-chromatic energy in the gas and subsequent gas amplification are converted into voltage pulses by resistor 10. The voltage pulses are amplified by linear amplifier 12 connected to resistor 10 through a cathode follower 11. The amplified pulses are applied in one case to an oscilloscope 13 calibrated to permit direct observation and determination of the constitution of the gas.

The constitution of the gas is preferably detremined by segregating the output pulses of the counter into groups according to their amplitudes by means of pulse height analyzer 14 and counting the number of pulses in that amplitude interval with scaler and rate meter 15. The amplitude of the escape peak or number of counts in this peak and the number of counts in the escape and main peaks provide information by which each element in the gas can be identified and its concentration determined.

In Fig. 2 the output of the counter containing xenon and krypton is shown graphically. The abscissae of the graph represent the amplitudes of the pulses produced in the output circuit in kev. while the ordinates represent the number of counts per second in a given amplitude interval. The pulse amplitudes are recorded by recorder 18 in terms of volts but may be plotted in terms of kev. since the pulse amplitudes are proportional to the incident energy by virtue of the proportionality of the counter. Curve 19 represents the complete pulse height distribution for xenon and krypton when the gases in the counter absorb incident radiation of energy of about 36 kev.

Curve member 20, termed the main peak represents the group of pulses averaging an amplitude represented by dimension line 21, the value of which is proportional to the incident energy from the source 7. Curve members 22 and 24, representing pulses with amplitudes averaging values represented by dimension lines 23 and 25 respectively, are the escape peaks for krypton and xenon which appear at about 23 kev. and 6 kev. respectively. The difference in amplitude between the main and escape peaks shown by dimension lines 26 and 27 represent the energy of the characteristic emission of xenon and krypton which are 30 and 13 kev. respectively. These characterize and identify the presence of xenon and krypton when they absorb energies exceeding their K-absorption edges. Curve members shown by dotted lines 28 and 29 represent escape peaks and their positions for other materials in gaseous form intermediate in atomic number between xenon and krypton that might be identified by the above method.

Another characteristic of the counter gas is the ratio of the total number of counts in the escape peak to the total number of counts in the main and escape peaks which ratio is termed the fluorescence yield. The fluorescence yield varies regularly from low values at low atomic numbers to high values at high atomic numbers. The fluorescence yields of about 0.6 and 0.84 identify the presence of krypton and xenon respectively. In a multicomponent system the ratio of the number of counts in the escape peak to the total number in escape and main peaks is modified, the presence and the relative concentrations of the components can be determined by calibrating runs made with known compositions in the composition range of interest. Such calibrating runs would allow working curves to be constructed which would show the variation of the number of counts in the escape peaks of the various components against composition.

Our invention is not limited to mixtures of rare gases or even to elements brought into the vapor state but extends to compounds and mixtures thereof which display an identifiable difference in energy between the escape and main peaks. More particularly, an interesting and important application of this invention is in product control of tetraethyl lead concentration in other substances such as gasoline or air. In this case, it is desired to know the exact concentration or trace amounts of lead in the finished product. In accordance with our invention, the substance containing tetraethyl lead is introduced continuously at a constant pressure into the proportional counter having a potential difference impressed across the electrodes sufficient to produce proportional counting action when the gas is ionized. The gas is irradiated with 90 kev. of incident radiation. Two pulse groups will appear in the output circuit at about 10 kev. and about 90 kev. corresponding to the escape and main peaks of lead respectively resulting in an energy interval of about 80 kev. corresponding to the characteristic emission energy of lead.

The lead concentration is absolutely determined by comparing the ratio of the number of counts in the escape peak of the unknown to the total number of counts in the escape and main peaks of the unknown mixture to ratios obtained from calibrating runs taken under similar conditions. Where the counter, the radiation source, and associated detecting equipment is standardized, the unknown concentration may be directly determined by the number of counts in the escape peak.

A proportional counter as described and claimed in copending U.S. application 404,524 filed January 18, 1954, by Hendee, Fine and Bleeksma, now U.S. Patent No. 2,837,677, may be suitably adapted for use in this method by providing constant pressure inlet and outlet valves which allow the gas to flow through the counter or which may seal the gas therein.

What is claimed is:

1. Apparatus for determining the constitution of a gas comprising a chamber, a pair of spaced electrodes in said chamber, means to introduce the gas into the chamber, a source of monochromatic X-radiation having an energy content above an absorption edge of an element in the gas whereby said element produces fluorescent energy, said X-ray source being positioned to expose said gas to the X-rays therefrom, means to apply a potential between said electrodes at which proportional counting action occurs when said gas is ionized and two groups of pulses are produced, pulses in one of said groups having amplitudes proportional to the energy of the X-radiation and constituting a main peak, pulses in the other group having amplitudes different from those in said first group related to the fluorescent energy and constituting an escape peak, pulses height discriminating means for segregating the pulses into said two groups to form said main and escape peaks, and means coupled to said pulse height discriminating means for measuring said main and escape peaks to identify said element.

2. Apparatus for determining the constitution of a gas comprising a chamber, a pair of spaced electrodes in said chamber, means to introduce the gas into the chamber, a source of monochromatic X-radiation having an energy content above an absorption edge of an element in the gas whereby said element produces fluorecent energy, said X-ray source being positioned to expose said gas to the X-rays therefrom, means to apply a potential between said electrodes at which proportional counting action occurs when said gas is ionized and two groups of pulses are produced, pulses in one of said groups having amplitudes proportional to the energy of the X-radiation and constituting a main peak, pulses in the other group having amplitudes different from those in said first group related to the fluorescent energy and constituting an escape peak, and means for segregating the pulses into said two groups and measuring the main and escape peaks to thereby identify said element.

3. Apparatus, as claimed in claim 2, in which the means for segregating said pulses into two groups and for measuring the main and escape peaks is an oscilloscope.

References Cited in the file of this patent

UNITED STATES PATENTS

| 2,610,303 | Bell | Sept. 9, 1952 |
| 2,641,710 | Pompeo et al. | June 9, 1953 |
| 2,650,307 | Koppius | Aug. 25, 1953 |
| 2,706,789 | Hughes | Apr. 19, 1955 |
| 2,778,947 | Scherbatskoy | Jan. 22, 1957 |

OTHER REFERENCES

Liebhafsky: Analytical Methods Based Upon X-Ray Absorption, published in Analytical Chemistry, January–June 1953, vol. 25, pp. 689 to 692.